United States Patent [19]
DeHart

[11] Patent Number: 6,043,584
[45] Date of Patent: Mar. 28, 2000

[54] END TURN PHASE INSULATOR AND METHOD OF USING SAME

[75] Inventor: Hobart DeHart, Austin, Ind.

[73] Assignee: Reliance Electric Industrial Company, Milwaukee, Wis.

[21] Appl. No.: 09/064,929

[22] Filed: Apr. 22, 1998

[51] Int. Cl.[7] .................................................. H02K 3/46
[52] U.S. Cl. .......................... 310/260; 310/194; 310/254; 310/258; 310/259; 310/270
[58] Field of Search .................................. 310/194, 254, 310/258, 259, 260, 270

[56] References Cited

U.S. PATENT DOCUMENTS

| | | | |
|---|---|---|---|
| 3,575,623 | 4/1971 | Stine | 310/260 |
| 3,829,720 | 8/1974 | Swanke et al. | 310/43 |
| 3,861,026 | 1/1975 | Swaim | 29/596 |
| 3,912,957 | 10/1975 | Reynolds | 310/260 |
| 4,161,669 | 7/1979 | Aimar | 310/194 |
| 4,218,630 | 8/1980 | Watanabe | 310/260 |
| 4,225,800 | 9/1980 | Magnaghi | 310/260 |
| 4,318,022 | 3/1982 | Miller | 310/260 |
| 4,403,162 | 9/1983 | Pallaro | 310/194 |
| 4,588,916 | 5/1986 | Lis | 310/260 |
| 4,904,893 | 2/1990 | Snider et al. | 310/260 |
| 5,081,382 | 1/1992 | Collings et al. | 310/54 |

*Primary Examiner*—Elvin Enad
*Attorney, Agent, or Firm*—William R. Walbrun; John J. Horn; Alex M. Gerasimow

[57] ABSTRACT

An end turn phase insulator for a stator assembly including a stator core having a plurality of slots and a stator winding composed of at least two different phase coils wound on the stator core through the slots. The phase coils form radially disposed end turns extending from ends of the stator core. The end turn phase insulator includes an elongated body formed of a flexible insulation material and is inserted between the radially disposed end turns. The elongated body has an elongated tab member which bends in a hook-shaped configuration about a lower portion of one of the end turns. A method of inserting and securing the insulator to the stator assembly is also disclosed.

14 Claims, 2 Drawing Sheets

END TURN PHASE INSULATOR AND METHOD OF USING SAME

BACKGROUND OF THE INVENTION

1. Field of the Invention

The present invention relates to end turn phase insulators for electromagnetic machines. More particularly, the invention pertains to an improved end turn phase insulator and method for insulating between different phases of end turn windings of a stator assembly.

2. Description of the Prior Art

A stator assembly of an electromagnetic machine, such as an electric motor, typically includes a stator core having a bore and axially extending, circumferentially spaced slots. Windings formed of magnet wire are wound through the slots and form groups of radially disposed end turns extending axially from the ends of the stator core. To prevent shorting between radially disposed end turns having different voltage phases, it is a common practice to provide an insulator therebetween.

One type of known end turn phase insulator includes an elongated rectangular shaped body formed of a flexible insulating material. During the stator assembly manufacturing process, the insulator is inserted between radially disposed end turns. After insertion of the phase insulators, the stator is typically subjected to a blocking operation whereby the end turns are compacted to obtain a particular configuration. During the blocking operation, shifting of the phase insulators can result in improper insulation between different phases of end turns. Further, wires from a particular end turn may drop or stray from that end turn. Where the stray wires come in contact with the stator core or an end turn of a different phase, shorting can result.

As will be described in greater detail hereinafter, the end turn phase insulator and method of using same of the present invention solves the aforementioned problems and employs a number of novel features that render it highly advantageous over the prior art.

SUMMARY OF THE INVENTION

Accordingly, it is an object of this invention to provide an improved end turn phase insulator and method of using same for a stator assembly of an electromagnetic machine.

Another object of this invention is to provide an end turn phase insulator which is resistant to shifting from its proper position during stator assembly blocking operations and which prevents shorting from stray wires of the end turns.

Still another object of this invention is to provide an end turn phase insulator that is inexpensive to manufacture, easy to use, and can be used with a wide variety of known stator assembly constructions.

To achieve the foregoing and other objectives, and in accordance with the purposes of the present invention, an end turn phase insulator is provided for a stator assembly. The assembly includes a stator core having a plurality of slots and a stator winding composed of at least two different phase coils wound on the stator core through the slots. The phase coils form radially disposed end turns extending from ends of the stator core. The end turn phase insulator includes an elongated body formed of a flexible insulation material and is sized for insertion between the radially disposed end turns. The elongated body has an elongated tab member extending transversely outwardly from a bottom edge thereof. The tab member is bendable radially inwardly in a hook-shaped configuration for extending about and adjacent with a lower portion of one of the end turns.

In accordance with an aspect of the invention, a method of insulating the end turns of the stator assembly is provided. The method of insulating includes the step of: providing an end turn phase insulator having an elongated body and an elongated tab member extending transversely outwardly from a bottom edge thereof; inserting the elongated body between radially disposed end turns allowing the tab member to extend radially inwardly of the stator core; bending the tab member in a hook-shaped configuration about one of the end turns; and securing the tab member in the hook-shaped configuration against one of the end turns.

Other objects, features and advantages of the invention will become more readily apparent upon reference to the following description when taken in conjunction with the accompanying drawings.

DETAILED DESCRIPTION OF THE PREFERRED EMBODIMENT

Figure 1:
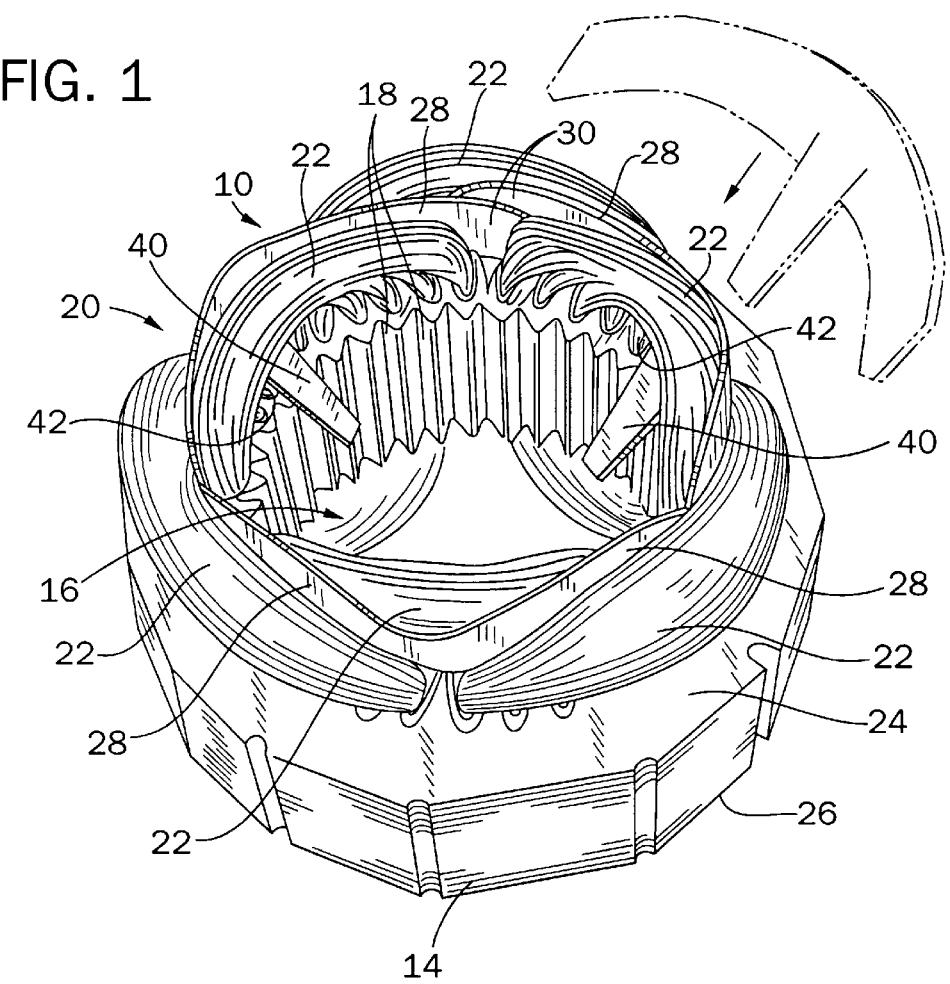
FIG. 1 is a perspective view of end turn phase insulators inserted between end turns of a stator assembly in accordance with the present invention.

Referring now to the drawings, a stator assembly 10 of an electromagnetic machine is illustrated in FIG. 1. The stator assembly 10 includes a stator core 12 formed by a stack of laminations 14. The stator core 12 has an axial bore 16 extending therethrough and axially extending, circumferentially spaced slots 18. A stator winding 20 composed of at least two different phase coils formed of magnet wire are wound through the slots 18 and form groups of radially disposed end turns 22 extending axially from ends 24,26 of the stator core 12.

During the assembly process, end turn phase insulators 28 are inserted between radially disposed end turns 22, as illustrated in FIG. 1, to separate the end turns and provide an insulation barrier therebetween. In the embodiment shown in FIG. 1, a series of insulators 28 are provided in an overlapping configuration with overlapping end portions 30 of each insulator 28 being disposed adjacent to an overlapping end portion 30 of another insulator 28 to form a circular collar.

Although the end turn phase insulator 28 of this invention is described in connection with a three-phase electric motor, it is to be understood that the insulator 28 could be used with various types of electric motors or other electromagnetic machines. Further, in some applications it may be desirable that the dimensions of the phase insulator 28 of the present invention would be varied to accommodate the various applications.

Figure 2:
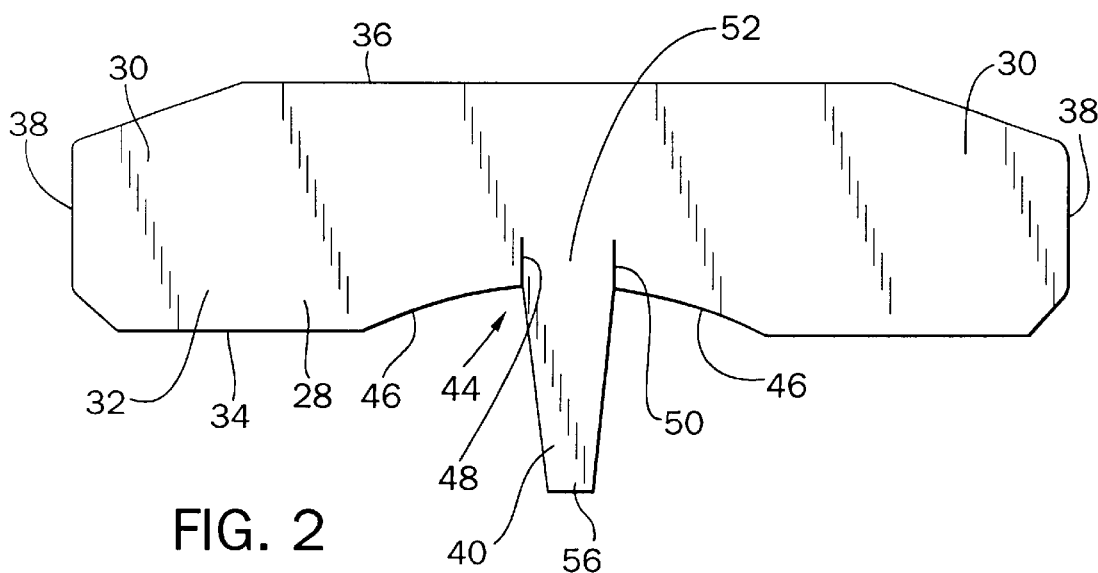
FIG. 2 is a front view of the end turn phase insulator of the present invention.

Referring to FIG. 2, the end turn phase insulator 28 of a preferred embodiment is illustrated. The insulator is formed from a stamping of a thin sheet of flexible insulation material, such as MYLAR. The insulator 28 includes an elongated body 32 which is sized for extending between radially disposed end turns, as illustrated in FIG. 1. The elongated body 32 is generally rectangular shaped and has a bottom edge 34, top edge 36, and opposite side edges 38.

Figure 3:
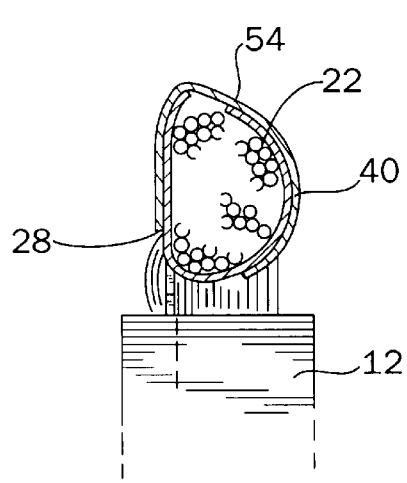
FIG. 3 is a sectional view of the end turn phase insulator along line 3—3 of FIG. 5 illustrating the tab member in a hook-shaped configuration.
Figure 5:
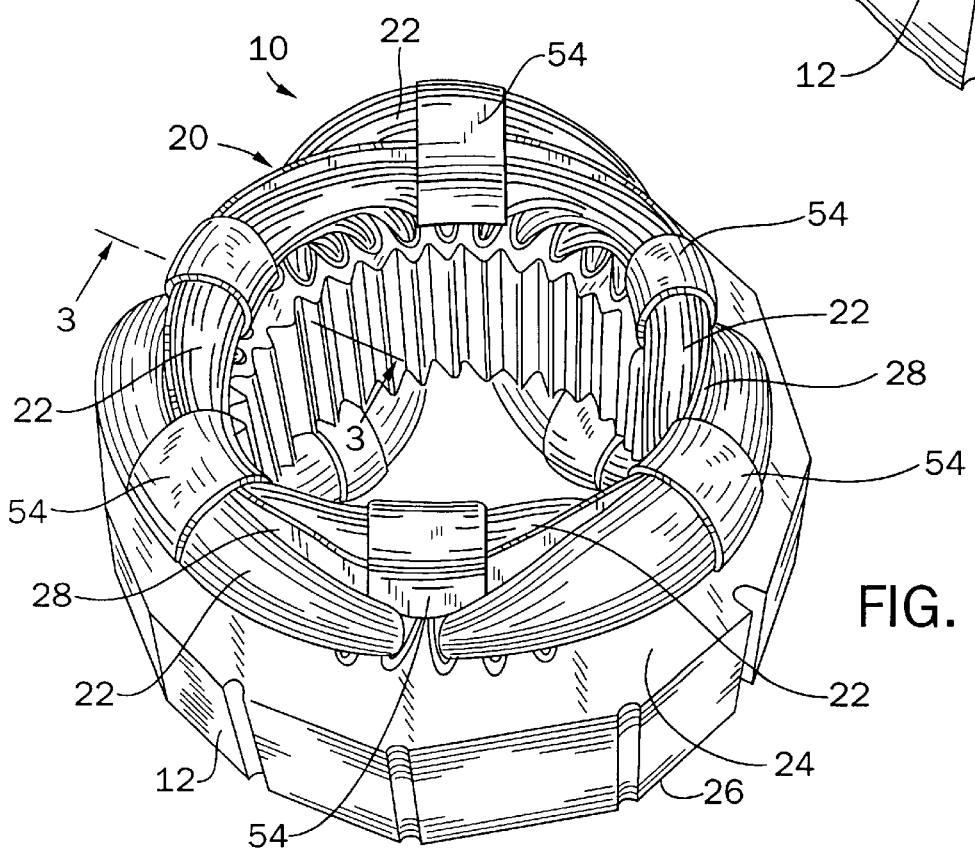
FIG. 5 is a perspective view illustrating the stator assembly after completing insertion and securement of the end turn phase insulators.

An elongated tab member 40 formed integral with the body 32 extends transversely outwardly from the bottom edge 34. Referring to FIGS. 3 and 5, the tab member 40 is bendable radially inwardly of the stator core 12 in a hook-shaped configuration for extending immediately adjacent about a lower portion 42 of one of the end turns 22.

Preferably, the tab member 40 extends outwardly from a centermost portion 44 of the bottom edge 34 equal distance from the opposite side edges 38. The bottom edge 34 of the body 32 includes a pair of arcuately shaped portions 46. Each of the pair of arcuately shaped portions 46 are positioned on opposite sides of the elongated tab member 40, as best illustrated in FIG. 4.

The elongated body 32 has first and second slits 48, 50 originating at the bottom edge 34 of the body 32 and continuing inwardly through a portion of the elongated body. The pair of slits 48,50 coextends to form a base portion 52 from which the tab member 40 extends integral therefrom, with the slits 48,50 being positioned on opposite sides of the tab member 40.

In a method of the present invention for insulating the end turns 22 of the stator assembly 10, the method includes the step of providing an end turn phase insulator 28 having an elongated body 32 and an elongated tab member 40 extending outwardly therefrom, as previously described. The elongated body 32 is then inserted between radially disposed end turns 22 allowing the tab member 40 to extend radially inwardly of the stator core 12 below one of the innermost adjacent end turns, as illustrated in FIG. 1.

Figure 4:
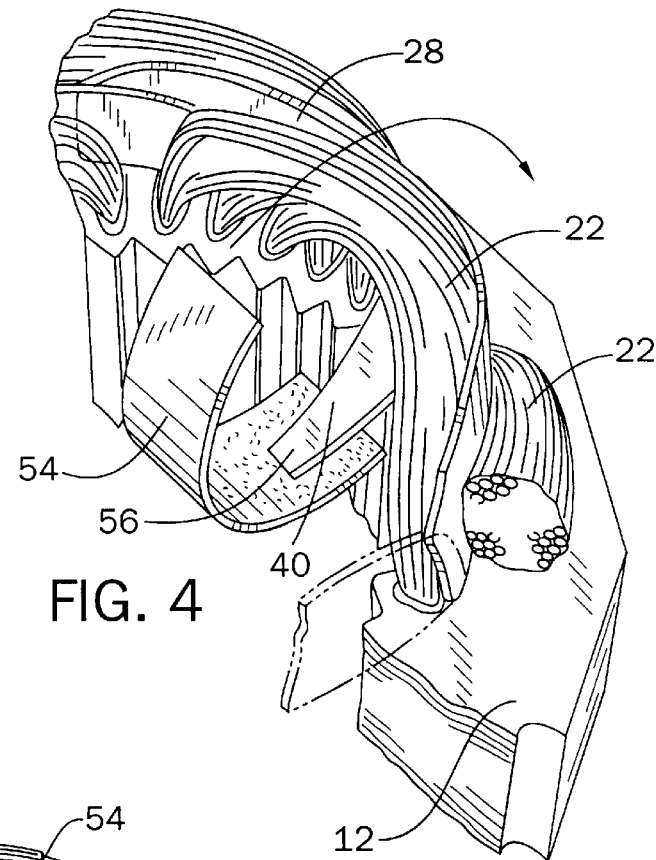
FIG. 4 is a partial perspective view of the stator assembly illustrating securement of the tab member.

Next, the tab member 40 is lifted upwardly in an axial direction away from the stator core 12, as illustrated in FIG. 4, causing the tab member to bend in a hook-shaped or bent configuration about and against the end turn 22. This allows the tab member 40 to contain any stray wires of the end turn and prevent the stray wires, for example, from dropping in a direction towards the stator core 12 or another end turn 22 which could cause an electrical short.

To secure the tab member 40 in the hook-shaped configuration against the end turn 22, a layer of adhesive type material 54, such as electrical tape, is applied across end turn 22 and an outer end portion 56 of the tab member 40 to adhesively secure the outer end portion 56 of tab member 40 to the end turn 22, as illustrated in FIG. 4. After inserting and securing all the necessary phase insulators, as depicted in FIG. 5, the stator assembly 10 can be inverted so that the end turn insulation process can be completed on the second end of the stator assembly 10, which is similarly configured.

After all the phase insulators 28 have been secured on both ends of the stator assembly 10, the stator assembly preferably undergoes a blocking operation whereby the end turns 22 are compacted to obtain a particular desired configuration. During the blocking operation, the phase insulators of the present invention are not as prone to position shifting like those previously described in the prior art.

Although the invention has been described by reference to some embodiments it is not intended that the novel device be limited thereby, but that modifications thereof are intended to be included as falling within the broad scope of the foregoing disclosure, the following claims and the appended drawings.

I claim:

1. An end turn phase insulator for a stator assembly including a stator core having a plurality of slots and a stator winding composed of at least two different phase coils wound on said core through said slots, the at least two different phase coils forming radially disposed end turns extending from ends of said stator core, said end turn phase insulator comprising:
    an elongated body formed of a flexible insulation material, the elongated body being sized for extending between radially disposed end turns; and
    an elongated tab member extending transversely outwardly from a bottom edge of the elongated body, the tab member being bendable and secured in a hook-shaped configuration for extending immediately adjacent about a lower portion of one of said end turns with an outer end portion of the tab member extending upwardly.

2. The end turn phase insulator of claim 1, wherein the tab member extends outwardly from a centermost portion of the bottom edge of the elongated body.

3. The end turn phase insulator of claim 1, wherein the bottom edge of the elongated body has a pair of arcuately shaped portions, each of said pair of arcuately shaped portions being positioned on opposite sides of the elongated tab member.

4. The end turn phase insulator of claim 1, wherein the elongated body includes a pair of slits extending upwardly and inwardly from the bottom edge of the body, each of said pair of slits being positioned on opposite sides of the tab member.

5. The end turn phase insulator of claim 4, wherein a portion of the body disposed between said pair of slits forms a base portion for said tab member with said tab member extending outwardly from said base portion.

6. A stator assembly of an electromagnetic machine, comprising:
    a stator core having axially extending and circumferentially spaced slots;
    a stator winding composed of at least two different phase coils wound on said core through said slots, the at least two different phase coils forming radially disposed end turns extending axially from ends of said stator core;
    an end turn phase insulator having an elongated body formed of a flexible insulation material, the elongated body extending between radially disposed end turns; and
    an elongated tab member extending transversely outwardly from a bottom edge of the elongated body, the tab member bending radially inwardly of said stator core in a hook-shaped configuration and extending and secured about a lower portion of one of said end turns with an outer end portion of the tab member extending upwardly.

7. The stator assembly of claim 6, wherein a series of similarly constructed end turn phase insulators are provided, the elongated bodies of the insulators being positioned between radially disposed end turns in an overlapping configuration with overlapping end portions of each elongated body being disposed adjacent to an overlapping end portion of another elongated body to form a circular collar.

8. The stator assembly of claim 6, wherein the tab member extends outwardly from a centermost portion of the bottom edge of the elongated body.

9. The stator assembly of claim 8, wherein the bottom edge of the elongated body has a pair of arcuately shaped portions, each of said pair of arcuately shaped portions being positioned on opposite sides of the elongated tab member.

10. The stator assembly of claim 9, wherein the elongated body has first and second slits originating at the bottom edge of the elongated body and continuing through a portion of the elongated body.

11. The stator assembly of claim 10, wherein the first and second slit coextend through a portion of the elongated body to form a base portion from which the tab member extends integrally therefrom.

12. The stator assembly of claim 10, further comprising means secured to one of said end turns for holding the tab member in the hook-shaped configuration against the lower portion of the one of said end turns.

13. A method of insulating end turns of a stator assembly including a stator core having a plurality of slots and a stator winding composed of at least two different phase coils wound on said core through said slots, the at least two different phase coils forming radially disposed end turns extending from ends of said stator core, said method comprising the steps of:

providing an end turn phase insulator having an elongated body formed of a flexible insulation material, the elongated body having an elongated tab member extending transversely outwardly from a bottom edge thereof;

inserting the elongated body between radially disposed end turn allowing the tab member to extend radially inwardly of the stator core;

bending the tab member in a hook-shaped configuration about one of said end turns with an outer end portion of the tab member extending upwardly; and securing the tab member in the hook-shaped configuration against the one of said end turns.

14. The method of claim 13, wherein the step of securing includes applying a layer of adhesive material across the one of said end turns and an outer end portion of the tab member to adhesively secure the outer end portion of tab member to the one of said end turns.

* * * * *